US009367228B2

(12) United States Patent
Oakley

(10) Patent No.: US 9,367,228 B2
(45) Date of Patent: Jun. 14, 2016

(54) FINE OBJECT POSITIONING

(75) Inventor: Andrew Oakley, Blackburn (GB)

(73) Assignee: Promethean Limited (GB)

( * ) Notice: Subject to any disclaimer, the term of this patent is extended or adjusted under 35 U.S.C. 154(b) by 689 days.

(21) Appl. No.: 13/172,082

(22) Filed: Jun. 29, 2011

(65) Prior Publication Data

US 2012/0001945 A1 Jan. 5, 2012

(30) Foreign Application Priority Data

Jun. 29, 2010 (GB) .................................. 1010941.1

(51) Int. Cl.
*G09G 5/00* (2006.01)
*G06T 13/00* (2011.01)
*G06F 3/0488* (2013.01)

(52) U.S. Cl.
CPC .................................. *G06F 3/0488* (2013.01)

(58) Field of Classification Search
USPC ......................................................... 345/672
See application file for complete search history.

(56) References Cited

U.S. PATENT DOCUMENTS

| 5,920,299 | A * | 7/1999 | Ohshima | G09G 3/2003 345/84 |
| 6,014,121 | A * | 1/2000 | Aratani | G06T 3/4015 345/87 |
| 6,340,994 | B1 * | 1/2002 | Margulis et al. | 348/625 |
| 7,577,925 | B2 * | 8/2009 | Zotov et al. | 715/863 |
| 7,664,335 | B2 * | 2/2010 | Kurumisawa | G09G 3/20 358/1.2 |
| 8,098,262 | B2 * | 1/2012 | Unsal et al. | 345/613 |
| 8,269,886 | B2 * | 9/2012 | Balram et al. | 348/446 |
| 2002/0063807 | A1 * | 5/2002 | Margulis | 348/745 |
| 2004/0196267 | A1 * | 10/2004 | Kawai et al. | 345/173 |
| 2006/0066590 | A1 * | 3/2006 | Ozawa et al. | 345/173 |
| 2006/0119588 | A1 * | 6/2006 | Yoon et al. | 345/173 |
| 2006/0274046 | A1 * | 12/2006 | Hillis et al. | 345/173 |
| 2008/0001923 | A1 * | 1/2008 | Hall et al. | 345/173 |
| 2009/0262086 | A1 * | 10/2009 | Chen | 345/173 |
| 2009/0322687 | A1 * | 12/2009 | Duncan et al. | 345/173 |
| 2010/0076454 | A1 * | 3/2010 | Bos | 606/130 |
| 2010/0097398 | A1 * | 4/2010 | Tsurumi | 345/634 |
| 2010/0245268 | A1 * | 9/2010 | Tamas et al. | 345/173 |
| 2011/0205169 | A1 * | 8/2011 | Yasutake | G06F 3/03547 345/173 |
| 2011/0214093 | A1 * | 9/2011 | Nishimura et al. | 715/863 |
| 2011/0229039 | A1 * | 9/2011 | Kitada | G06K 9/00174 382/187 |
| 2012/0044173 | A1 * | 2/2012 | Homma | G06F 3/0488 345/173 |

FOREIGN PATENT DOCUMENTS

WO 2009/158685 A2 12/2009

OTHER PUBLICATIONS

Intellectual Property Office, "British Search Report for British International Application No. GB 1010941.1", Dated: Oct. 25, 2010, Publisher: British Patent Office, Published in: GB.

* cited by examiner

*Primary Examiner* — Ryan R Yang
(74) *Attorney, Agent, or Firm* — Brient Globerman, LLC; Kyle M. Globerman

(57) ABSTRACT

There is disclosed a method of controlling the positioning of an object displayed on an interactive display surface, in which interactive display surface the display resolution is greater than the detection resolution, the method comprising: determining selection of a displayed object on the interactive display surface; detecting movement of an input at the interactive display surface associated with the selected displayed object; and in an object transformation mode, moving at least one displayed pixel of the selected displayed object by a distance which is less than the distance of the detected movement of the detected input.

18 Claims, 3 Drawing Sheets

FINE OBJECT POSITIONING

CROSS REFERENCE TO RELATED APPLICATIONS

British Application Number GB 1010941.1, filed Jun. 29, 2010, is incorporated herein by reference.

FIELD OF THE INVENTION

The present invention relates to the control of the transformation of the display of a graphical object displayed on the surface of an interactive display, which surface is adapted to detect inputs at the surface thereof to control the graphical object.

BACKGROUND OF THE INVENTION

Several technologies exist that adapt a display screen or display surface associated with a computer to be interactive. An interactive display screen or surface is adapted to allow detection of inputs at the surface thereof, and is often referred to simply as an interactive surface. The detected inputs at the interactive surface can be used to manipulate objects displayed on the surface, annotate the display surface, and generally control software applications running on the computer in a similar way to a conventional computer mouse.

Example known interactive surfaces are adapted to detect touch inputs on the surface, or detect the presence of specially adapted input devices, such as pen-type devices.

In general, interactive surfaces adapted for use with pens advantageously have a greater input detection resolution than touch input surfaces.

However, in some scenarios a touch sensitive interactive surface may be a preferable implementation. Touch sensitive interactive surfaces tend to be used for providing solutions in public kiosk implementations, where special pens are not available or not desirable. The relative cost of touch and pen implementations are such that cost factors may dictate a touch solution for some implementations. Further, in some applications, a touch solution may have particular advantages. An example of such an application is the use of an electronic whiteboard system incorporating an interactive surface in an educational environment for young children, where having to control a pen to use the whiteboard on a vertical surface can be problematic for users. A touch surface may also be more suited to an environment in which multiple users provide inputs at the interactive surface at the same time.

Thus sometimes a trade-off must be made in terms of the pen or touch positioning location accuracy (which may be best provided by a pen-type interactive surface) against cost, speed of response, or capability to cope with many simultaneous touches (which may be best provided by a touch-type interactive surface). Often all of these factors are interrelated.

This may lead to a situation where in a given implementation the image pixel resolution of the displayed image is greater than the resolving resolution of the touch sensing technology, i.e. the display resolution is greater than the detection resolution.

For the purposes of basic control and annotation, this disparity between resolutions is rarely a problem. However for situations where objects must be moved and located with precision, a problem arises. An example of such a scenario is the use of a touch sensitive interactive whiteboard in an education environment. Consider an example implementation in a mathematics application where it is required for a user to control the position of an on-screen virtual protractor to make a precise measurement. Without pixel-accurate movement control, which requires the detection resolution to be compatible with the display resolution, this may not be possible.

It is an object of the invention to provide an improved arrangement to address one or more of the above-stated problems, and provide for finer control of the transformation of a displayed object in a system where the image pixel resolution of a displayed image is greater than the resolving resolution of the input sensing technology.

SUMMARY OF THE INVENTION

In accordance with the invention there is provided a method of controlling the positioning of an object displayed on an interactive display surface, in which interactive display surface the display resolution is greater than the detection resolution, the method comprising: determining selection of a displayed object on the interactive display surface; detecting movement of an input at the interactive display surface associated with the selected displayed object; and in an object transformation mode, moving at least one displayed pixel of the selected displayed object by a distance which is less than the distance of the detected movement of the detected input.

The step of moving at least one displayed pixel of the selected displayed object may comprise moving the at least one displayed pixel from an initial display pixel position to an adjacent display pixel position in responsive to movement of the detected input from an initial detection position to an adjacent detection position.

The at least one displayed pixel of the selected displayed object may be moved from an initial display pixel position to a further display pixel position which is most closely located to a reduced scale distance of a distance of the detected input from its initial detected position to its further detected position.

The method may further comprise: in a further object transformation mode, moving at least one displayed pixel of the selected displayed object by a distance corresponding to a distance of the detected movement of the detected input; and selecting between the object transformation mode and the further object transformation mode.

The step of moving at least one displayed pixel of the selected displayed object may comprise moving the at least one displayed pixel from an initial display pixel position to a further display pixel position in response to movement of the detected input from an initial detection position to a further detection position, the further display pixel position being the display pixel position which is most closely located to the position of the further detection position.

In the further object transformation mode each input movement detected between detection positions may cause at least one pixel of the displayed object to move by a plurality of pixel positions, and wherein in the object transformation mode each input movement detected between detection positions causes at least one pixel of the displayed object to move by a single pixel position.

In the further object transformation mode the at least one displayed pixel may be movable by a distance which corresponds to the distance by which the detected input is moved.

In the object transformation mode the at least one displayed pixel may be movable by a distance which is a reduced scale distance of the distance by which the detected input is moved.

The method may further comprise selecting between the modes in dependence on a characteristic of the detected input.

The characteristic of the detected input may be one or more of: the contact surface area of the detected input; the number of contact points associated with the detected input; the position of a contact point of the detected input relative to the selected object; or the speed of movement of the detected input.

A computer program may be adapted to perform any stated method.

A computer program product may be adapted to store computer code which, when run on a computer, performs any stated method.

The invention also provides an interactive display system including an interactive display surface for detecting one or more inputs at said surface, and for controlling the display of an object on the interactive display surface in dependence on detected movement of an input at the surface whilst the input is selecting the object, the system comprising: a displayed object transformation controller, for transforming the display of at least one displayed pixel of the selected object, in dependence upon a detected movement of the input at the interactive surface, the displayed object transformation controller being adapted, in a first mode of operation, to move at least one displayed pixel of the displayed object by a distance which is less than the detected distance moved by the input means.

The displayed object transformation controller may be adapted to move the at least one displayed pixel from an initial display pixel position to an adjacent display pixel position responsive to movement of the detected input from an initial detection position to an adjacent detection position.

The displayed object transformation controller may be adapted to move the at least one displayed pixel from an initial display pixel position to a further display pixel position which most closely matches the position of a reduced scale distance of a distance of the detected input from its initial position, in a direction determined by the input detected direction.

The displayed object transformation controller may be configured, in a further object transformation mode, to move at least one displayed pixel of the selected displayed object by a distance corresponding to a distance of the detected movement of the detected input; and is further configured to select between the object transformation mode and the further object transformation mode.

The displayed object transformation controller may be further configured to move the at least one displayed pixel to a displayed pixel position responsive to movement of the detected input from an initial detection position to a further detection position, the further display pixel position being the display pixel position which most closely matches the position of the further detection position.

The displayed object transformation controller may be further configured, in the further object transformation mode, such that at least one pixel of the selected displayed object is moved from a starting position to a finishing position which most closely matches the detected finishing position of the detected input.

The displayed object transformation controller may be further configured such that in the further object transformation mode each input movement detected between detection positions causes at least one pixel of the displayed object to move by a plurality of pixel positions, and wherein in the object transformation mode each input movement detected between detection positions causes at least one pixel of the displayed object to move by a single pixel position.

The invention provides in one aspect a method in an interactive display system, in which inputs are detected at an interactive surface for controlling the display of an object displayed on the interactive surface, in which system the display resolution is greater than the detection resolution, wherein in a first mode of operation a detected movement of an input from one detection position to an adjacent detection position in a particular direction results in the movement of a displayed pixel of the object from one display position to an adjacent display position in a direction determined by the direction of the detected movement of the input.

In this way, the displayed pixel may move by an actual distance which corresponds to a reduced distance of the actual distance moved by the detected input. The movement is preferably in the same direction.

A detection position may comprise a position at which an input can be detected on the interactive surface. A display position may comprise a position at which a pixel of an image can be displayed.

In a second mode of operation a detected movement of an input from one detection position to an adjacent detection position in a particular direction may result in the movement of a displayed pixel of the object from one display position to a non-adjacent display position in a direction determined by the direction of movement of the input. Thus, the detected movement of an input from an initial detection position to an adjacent detection position in a particular direction may result in the movement of a displayed pixel of the object from an initial display position to a display position which is a plurality of display positions away from the initial display position.

In this way, the displayed pixel may move by an actual distance and direction which corresponds to the actual distance and direction moved by the detected input.

The invention further provides in this aspect an interactive display system, adapted to detect inputs at an interactive surface for controlling the display of an object displayed on the interactive surface, in which system the display resolution is greater than the detection resolution, the system being configured such that in a first mode of operation a detected movement of an input from one detection position to an adjacent detection position in a particular direction results in the movement of a displayed pixel of the object from one display position to an adjacent display position in a direction determined by the direction of the detected movement of the input.

The system may be further configured such that in a second mode of operation a detected movement of an input from one detection position to an adjacent detection position may result in the movement of a displayed pixel of the object from one display position to a non-adjacent display position.

BRIEF DESCRIPTION OF THE FIGURES

The invention will now be described by way of example with reference to the accompanying figures, in which.

DESCRIPTION OF THE PREFERRED EMBODIMENTS

The invention is now described by way of reference to various examples, embodiments, and advantageous applications. One skilled in the art will appreciate that the invention is not limited to the details of any described example, embodiment or detail. In particular the invention is described with reference to an exemplary interactive display system. One skilled in the art will appreciate that the principles of the invention are not limited to such a described system.

A typical example of a system incorporating an interactive surface is an electronic whiteboard system. An electronic whiteboard system typically is adapted to sense the position of a pointing device or pointer relative to a work surface (the display surface) of the whiteboard, the work surface being an interactive surface. When an image is displayed on the work surface of the whiteboard, and its position calibrated, the pointer can be used in the same way as a computer mouse to manipulate objects on the display by moving a pointer over the surface of the whiteboard.

A typical application of an interactive whiteboard system is in a teaching environment. The use of interactive whiteboard systems improve teaching productivity and also improve student comprehension. Such whiteboards also allow use to be made of good quality digital teaching materials, and allow data to be manipulated and presented using audio visual technologies.

A typical construction of an electronic whiteboard system comprises an interactive display forming the electronic whiteboard, a projector for projecting images onto the display, and a computer system in communication with the electronic whiteboard for generating the images for projection, running software applications associated with such images, and for processing data received from the display associated with pointer activity, such as the location of the pointer on the display surface. In this way the computer system can control the generation of images to take into account the detected movement of the pointer on the interactive surface.

In known systems the pointer can be provided as a specially adapted pen, to interact with an interactive surface which is provided with appropriate input detection technology. The pen and the interactive surface may interact by electromagnetic means. Other techniques for detecting a pointer position on an interactive surface are known, such as the use of camera technology. The present invention is not limited in its applicability to any particular input detection technology incorporated in an interactive surface. However as set out in the background section above particular problems manifest themselves in a touch input detection technology, and therefore a main embodiment of the invention is described in the context of an electronic whiteboard including a touch sensitive interactive surface.

Figure 1:
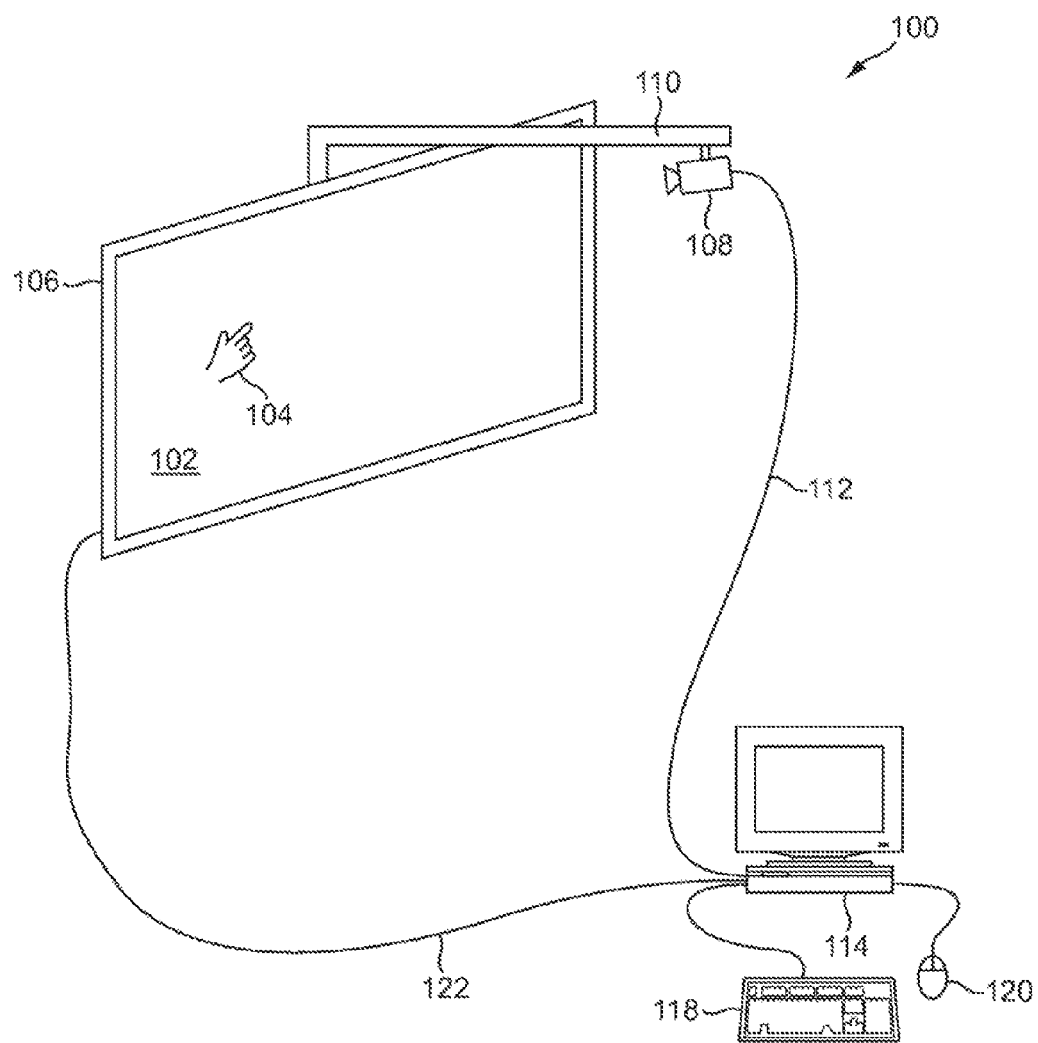
FIG. 1 illustrates the main elements of a typical known example interactive display system.

With reference to FIG. 1, an exemplary interactive display system 100 comprises: a whiteboard assembly arrangement generally designated by reference numeral 106, and including an interactive surface 102; a projector 108, and a computer system 114. The projector 108 is attached to a fixed arm or boom 110, which extends in a direction perpendicular from the surface of the whiteboard 106. One end of the boom 110 supports the projector 108 in a position in front of the display surface 102, and the other end of the boom 110 is fixed to the whiteboard 106 or near the whiteboard, such as a frame associated with the whiteboard 106, or a wall on which the whiteboard 106 is mounted.

Although the example interactive display system is illustratively a projection system, the invention is not limited to the use of interactive surfaces in a projection system. The interactive surface may, for example, be configured as an emissive surface.

The computer 114 controls the interactive display system. A computer display 116 is associated with the computer 114. The computer 114 is additionally provided with a keyboard input device 118 and a mouse input device 120. The computer 114 is connected to the whiteboard 106 by communication line 122 to receive input data from the display surface 102, and is connected to the projector 108 by a communication link 112 in order to provide display images to the projector 108. Although in FIG. 1 these are shown as wired connections, they also may be implemented as wireless connections.

Shown in FIG. 1 is a pointing device 104, which is used to provide inputs at the interactive display surface 102. As noted above, in the main embodiment described herein, the interactive surface is a touch sensitive surface, and the pointing device 104 is illustrated as a finger/hand. The invention is not limited in its applicability to any particular touch detection technology.

As is known in the art, the computer 114 controls the interactive display system to project images via the projector 108 onto the interactive surface 102, which can be referred to as an interactive display surface. The position of the pointing device 104 is detected by the interactive display surface 102, data returned to the computer 114, and location information determined by the computer 114. The pointing device 104 operates in the same way as a mouse to control the displayed images.

A problem which the present invention addresses can be understood with respect to FIGS. 2(a) and 2(b).

FIG. 2(a) illustrates an array of pixels generally designated by reference numeral 202. As can be seen, there is a regular, fixed spacing between each pixel in the horizontal and vertical directions. The number of pixels per unit area defines the display resolution. As illustrated in FIG. 2(a), the spacing of pixels in both the vertical and horizontal directions—or the x and y axes—is a dimension x. In alternative arrangements, the spacing in the vertical direction may be different to that of the horizontal direction. In general, the smaller the pixel spacing (i.e. the smaller the value of x), the greater the display resolution.

In this description, the term display resolution is used to refer to the resolution of displayed images, being the number of display pixels per unit area. This may include a fixed spacing in both the vertical and horizontal directions as shown, or a first fixed spacing in the horizontal direction and a second fixed spacing in the vertical direction.

FIG. 2(b) illustrates an array of detection points generally designated by reference numeral 210. As can be seen, there is also a regular, fixed spacing between each detection point in the horizontal and vertical directions. The number of detection points per unit area defines the detection resolution. As illustrated in FIG. 2(b), the spacing of pixels in both the vertical and horizontal directions—or the x and y axes—is a dimension y. In alternative arrangements, the spacing in the vertical direction may be different to that of the horizontal direction. In general, the larger the detection point spacing (i.e. the larger the value of y), the lower the detection resolution.

In this description, the term detection resolution is used to refer to the resolution by which inputs can be detected at the interactive surface, being the number of detection points per unit area on the interactive surface. This may refer to a fixed spacing in both the vertical and horizontal directions as shown, or a first fixed spacing in the horizontal direction and a second fixed spacing in the vertical direction.

Figure 2:
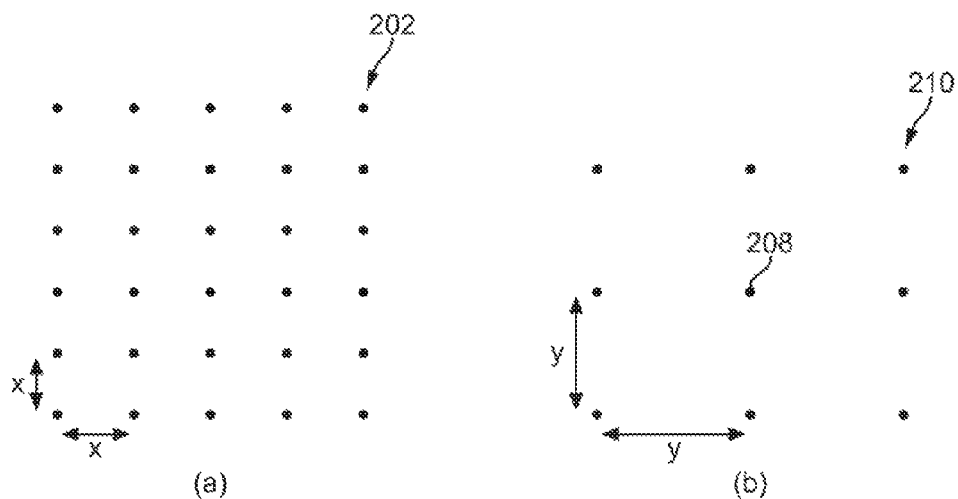
FIGS. 2(a) and 2(b) illustrate a prior art problem addressed by the invention.

Although not drawn to scale, the arrays of FIGS. 2(a) and 2(b) are drawn to illustrate a difference in resolution there between. It can be seen that the spacing x of the pixels in FIG. 2(a) is smaller than the spacing y of the detection points in FIG. 2(c), such that there are more display pixels per unit area than detection points. Thus the display resolution is greater than the detection resolution. This gives rise to a problem, in that the display resolution being greater than the detection resolution gives rise to difficulty in mapping the detected position of an input to a specific display pixel. For example, if an input is detected at detection position 208 of the array 210 of FIG. 2(*b*), there are a number of potential display pixels with which the position could be associated. Therefore the detected position input cannot be precisely mapped to a display pixel.

If the detection resolution was the same as the display resolution, then each detected input could be accurately mapped to the display pixels.

The invention addresses this problem by providing a method for controlling the transformation, under the control of a moving input at the interactive surface, of the graphical representation of a graphical object displayed on the interactive display surface, such that responsive to a movement of a detected input for a selected object, the display of the displayed object is transformed. The transformation is movement of at least one display pixel of the displayed object by a distance corresponding to at least one display pixel position, the actual distance moved being less than the actual distance by which the interactive surface detects the input to move.

The transformation of the displayed object is a movement. The movement may be a movement of the entire displayed object, or a movement of one or more display pixels of the displayed object. The movement may be to move a displayed object to a new location; to rotate a displayed object; to resize a displayed object; or in 3-dimensions to adjust the depth of the displayed object. All these movements require movement of at least one display pixel of a displayed object, but not necessarily all display pixels of the displayed object.

Thus, the detected actual distance of movement of the input is scaled, and the display of the object associated with the detected input transformed by the actual scaled distance. As such, the ratio of detected actual input distance to transformed actual object distance is 1:n, where n is less than one. For every detected unit of distance moved by the input, the displayed object is therefore transformed by a lesser scaled distance. A detected unit of distance may be the distance between adjacent detection points in FIG. 2(*b*); i.e. the input detection resolution.

In a preferred embodiment, the scaling may be set to translate or map the input detection resolution to the display resolution, such that responsive to detection of movement from one detection point to an adjacent detection point, an object (or a point of an object) is moved from one displayed pixel to an adjacent displayed pixel. Thus if the display resolution is twice the detection resolution (i.e. the detection points are separated by a distance y which is twice the distance by which the display pixels are separated, such that y=2x), then the ratio of detected actual input distance to transformed actual object distance is 1:0.5.

The implementation of any such scaling may be selective. The scaling may be provided as a first mode of operation. In a second mode of operation, a different scaling may be applied to the detected distance by which an input is detected to move, to transform the display of a displayed object. Alternatively, in a second or further mode of operation, no scaling may be applied to the detected distance by which an input is detected to move, to transform the display of a displayed object.

In a preferred implementation, in the first mode of operation the transformation of the display of the object may be appropriately scaled to be less than the distance by which the associated detected input is moved; and in a second mode of operation the transformation of the display of the object may correspond to the distance by which the detected input is moved.

The direction of movement of the display of the object is determined by the direction of movement of the input. Preferably the movement of the display of the object is in the same direction as the detected movement of the input.

In a first preferred mode of operation the display of the object is preferably transformed by a distance of one display pixel in response to a detected movement of the input which corresponds to a distance of more than one display pixel spacing. In the preferred embodiment, this mode of operation is enabled only when the display resolution is greater than the detection resolution. The display of the object is preferably transformed by a distance of one display pixel in response to a detected movement of the input which corresponds to one detection spacing. That is, the display of the object is preferably transformed by a distance of x in response to a detected movement of the input of a distance y.

This first preferred mode of operation can be considered a first displayed object transformation mode, involving moving the displayed position of at least one display pixel of the selected displayed object by one or more units of actual distance which is less than the actual distance of the detected movement of the detected input. As noted above, the displayed position of a selected object may be moved by one display pixel in response to detection of the movement of the pointing device by one detection position. As the display resolution is greater than the detection resolution, this results in the actual distance moved by at least one display pixel of the displayed object being less than the actual distance moved by the pointing device.

Alternatively, in this displayed object transformation mode at least one display pixel of the selected displayed object may be moved from a starting position to a finishing position which most closely matches a reduced scale version of a distance the detected input moves from its starting point, in the detected direction.

In a preferred second mode of operation the object is preferably movable by a distance of multiple display pixels, in response to a detected movement of the input which corresponds to the same distance of multiple display pixels spacing.

This second mode of operation can be considered a second displayed object transformation mode, involving moving the displayed position of at least one pixel of the selected displayed object by more than one unit of pixel spacing distance corresponding to a unit of detected resolution distance corresponding to the actual detected movement of the detected input. Thus, for example, if the display resolution is n times the detection resolution, for each detected movement of the pointing device between adjacent detection points, the displayed object is moved by n pixels.

Alternatively, in the second displayed object transformation mode at least one pixel of the selected displayed object is moved from a starting position to a finishing position which most closely matches the actual detected finishing position of the detected input.

In general, if in an embodiment the ratio of the display resolution to the detection resolution is n:m, in the first displayed object transformation mode each m units of input movement detected may cause the displayed object to move by n pixels, and in the second displayed object transformation mode each m units of input movement detected may cause the displayed object to move by mn pixels.

In a preferred implementation, the system is adapted to switch between the preferred first and second modes of operation. Such switching may be in accordance with an automatic arrangement, or by manual selection.

In a preferred arrangement, an automated switching is provided. Examples of techniques for providing for the switching between modes are set out further hereinbelow.

Figure 3:
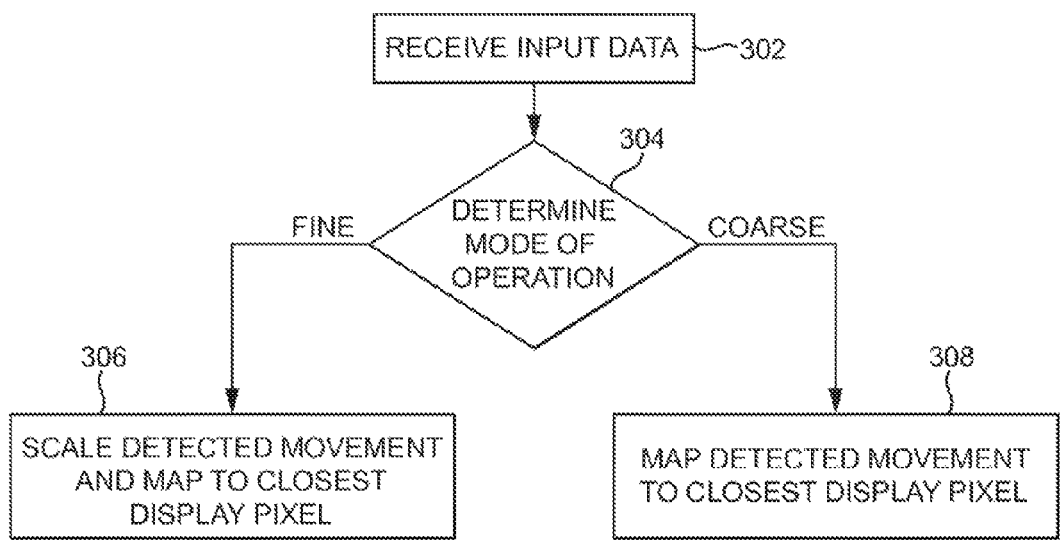
FIG. 3 illustrates a preferred technique for implementation of the invention.

With reference to FIG. 3, there is illustrated an exemplary process which may be implemented into computer systems associated with an interactive display, in accordance with a preferred embodiment of the invention.

In a step 302 input data detected at the interactive surface is received. In a step 304, a determination is made as to the mode of operation to be entered. In general, a "fine" mode of operation may be entered, or a "coarse" mode of operation may be entered. In the fine mode of operation, the transformation of a display pixel of a displayed object, responsive to detection of movement of an input associated with that object, is controlled to be achieved in a fine, or precise, way. This corresponds to the first mode of operation described above, where the detected movement is scaled. In the coarse mode of operation the transformation of a display pixel of a displayed object, responsive to detection of movement associated with an input selecting that object, is achieved in a coarse, or imprecise, way. This corresponds to the second mode of operation described above, where the detected movement is not scaled, but mapped.

In dependence on the mode of operation determined in step 304, the fine mode of operation may be entered in step 306. In step 306, the detected movement of the input is scaled and the scaled movement then mapped to the closest display pixel to the determined location. In a coarse mode of operation in step 308, the detected movement of the input is mapped to the closest display pixel (without any scaling).

The automated switching preferably provides for selecting between the first and second modes of operation, in step 304, in dependence on a characteristic of the detected input.

Example techniques for determining the selection are described below.

In one arrangement, the characteristic of the detected input is the contact surface area of the detected input. Such an arrangement may rely upon the detected contact surface of the area being indicative of how accurately the position of the detected input is to be resolved. For example, a selection technique may implement the first mode of operation if the width of the detected input is determined to be wider than the space between two pixels.

This technique can be considered a generalisation of an example described below, where a distinction is made between a single finger and multiple fingers or a flat hand.

In this arrangement, where the invention is implemented in an electronic whiteboard system adapted to detected inputs from touch inputs, the contact surface area of the detected input can be used to indicate which type of input is being used. A threshold value may be set, and if the detected contact area is determined to be less than the threshold, the input may be assumed to require fine-positioning and the first mode of operation is enabled. If the detected contact area is determined to be greater than the threshold, the input may be assumed to require coarse positioning, and then the second mode of operation is enabled.

In another example utilising this arrangement, the switching may be determined in dependence upon distinguishing between types of touch. For example the touch input detection technology is adapted to assess the area of touch, using techniques well-known in the art, to distinguish between a flat hand and one finger making contact with the interactive surface within the object to be moved.

If a flat hand is detected, then the selected object is determined to be moved in a coarse manner about the surface corresponding to the raw resolution of the sensing technology. As such, each incremental step of touch resolution results in the object being moved to the nearest representative pixel of the display technology. For example if the touch sensor resolution had half the resolving resolution of the display resolution, each step of touch movement would cause the object to jump two display pixels at a time.

If a finger is detected, then the selected object is determined to be moved in a fine manner about the surface corresponding to a higher resolution than the resolution of the sensing technology. The sensor will detect the smaller surface area of contact from the finger in comparison to the flat hand, and switch to a fine positioning mode of operation. The user will then need to move their finger by a distance further than they want the object to move, in order to achieve the desired movement of the object. Thus a positioning scaling factor is introduced. In an example, the user is required to move their finger two units of actual distance to move the object one unit of actual distance. Thus a 1:2 scaling is provided—for each two detected step units of distance of the finger, the object is moved by one display pixel. To make the system even easier to control, the scaling could be made 1:3 or 1:4, requiring 3 or 4 position sensing increments to move the object one display pixel.

This example could be extended, to include the possibility that the scaling ratio is dictated by the number of fingers: e.g. 2 fingers gives a scaling ratio of 1:2; 3 fingers gives a scaling ratio of 1:3.

In another arrangement, the characteristic of the detected input applied in step 304 is the number of contact points associated with the detected input.

An example in accordance with this arrangement is the selection of the mode of operation in accordance with the number of fingers detected for the object selection. The detection of one finger may select the first mode of operation, and fine positioning to occur. The detection of two fingers may select the second mode of operation, and coarse positioning to occur.

In yet another arrangement the characteristic of the detected input applied in step 304 is the position of a contact point of the detected input relative to the selected object.

An example in accordance with this mode of operation is that if the detection of the input is in the centre of the object, the second mode of operation is enabled and coarse positioning takes place. If the detection of the input is approximately half way to the edge of the object, the first mode of operation is enabled and fine positioning takes place. For example, where the displayed object is a protractor, touching the object in the middle allows the protractor to be generally moved around the display. Touching the protractor at the edge allows the protractor object to be precisely moved to, e.g., measure an angle.

A yet further example of a switching control mechanism is detection of the speed at which the detected input is moving. If the detected input is moving slowly (below a predetermined speed threshold), then the first mode of operation is enabled, and the detected input movement is scaled. If the detected input is moving quickly (above a predetermined speed threshold), then the second mode of operation is enabled, and the detected input movement is not scaled.

Overall, the selection technique comprises: determining selection of a displayed object on the interactive display surface; detecting movement of an input at the interactive display surface associated with the selected displayed object; and determining a displayed object transformation mode in dependence on a characteristic of the detected input.

In an embodiment, the system may be adapted such that when a displayed object is selected by the pointer, a display window "pops up" on the display, within which the pointing device can be positioned and moved, to control the movement of the displayed object in a fine positioning mode. Thus the object is first selected, and then the movement to be applied to the object is entered in the pop-up box. The direction of the movement is made in dependence upon the direction of movement of the pointer within the pop-up box, and the appropriate scaling is applied to the detected movement to move the displayed object.

Figure 4:
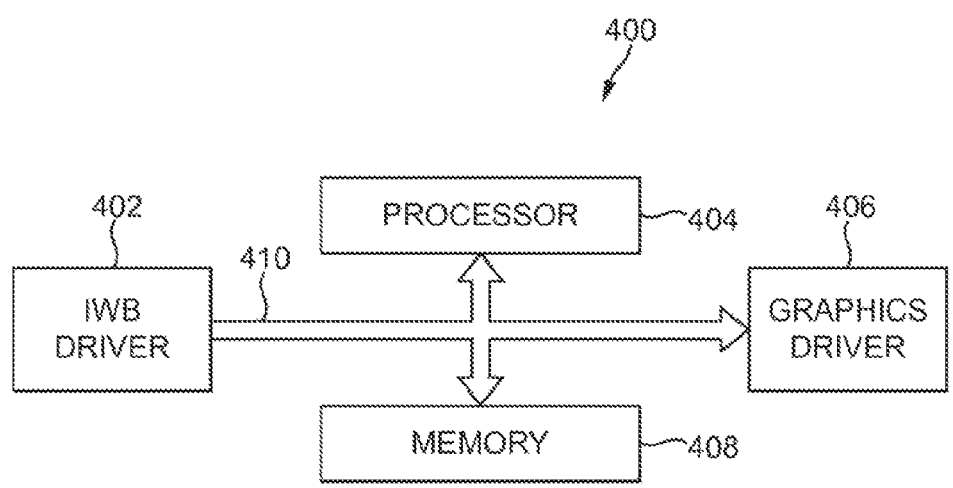
FIG. 4 illustrates the architecture of a computer system incorporating the invention.

With reference to FIG. 4, there is illustrated the main functional elements of a computer system for controlling an interactive surface in accordance with embodiments of the invention. The computer system 400 comprises a processor 404, a memory 408, a graphics driver 406, and an interactive whiteboard driver 402. The processor 404, memory 408, graphics driver 406 and interactive whiteboard driver 402 are interconnected by a communications bus 410. Data from the interactive surface, representing data detected by the interactive surface at its surface, is delivered to the interactive whiteboard driver 402, and processed by the processor 404. The processor 404 uses the memory 408 to store data as appropriate in order to achieve the necessary processing. The processed data processed by the processor 404 results in updated data being delivered to the graphics driver 406, including updated positioning information for displayed objects. The functionality of the present invention is implemented and controlled by the processor 404.

The methods described herein may be implemented on computer software running on a computer system. The invention may therefore be embodied as a computer program code being executed under the control of a processor of a computer system. The computer program code may be stored on a computer program product. A computer program product may be included in a computer memory, a portable disk or portable storage memory, or hard disk memory.

The invention is described herein in the context of its application to a computer system forming part of an interactive display system. It will be understood by one skilled in the art that the principles of the invention, and embodiments described herein, are not limited to any specific interactive display system. The principles of the invention and its embodiments may be implemented in any interactive display system. The invention and its embodiments is not limited to the use of a pointer or pointing device in combination with an interactive display system, and the invention and its embodiments equally apply to arrangements in which a touch-sensitive touch surface arrangement is provided for the interactive display, or any other type of interactive surface is provided such as one utilising camera technology.

Although the invention is described herein by way of a reference to a main embodiment comprising an electronic whiteboard in an educational environment, one skilled in the art will appreciate that the invention is limited neither to an electronic whiteboard nor to educational applications. The inventions is applicable to any interactive surface, such as for example an interactive surface provided as integral to a computing device, such as a so-called slate device, or interactive surfaces configures a table-top devices. It will also be understood by one skilled in the art, however, that the invention and its embodiments are not limited to application in an educational environment. One skilled in the art will envisage other possible applications.

The invention has been described herein by way of reference to particular examples and exemplary embodiments. One skilled in the art will appreciate that the invention is not limited to the details of the specific examples and exemplary embodiments set forth. Numerous other embodiments may be envisaged without departing from the scope of the invention, which is defined by the appended claims.

What is claimed is:

1. A method of controlling the positioning of an object displayed on an interactive display surface, in which interactive display surface a display resolution is greater than a detection resolution, the method comprising:
   determining selection of a displayed object on the interactive display surface;
   detecting movement of an input at the interactive display surface associated with the selected displayed object; and
   in an object transformation mode, moving at least one displayed pixel of the selected displayed object by a distance which is less than the distance of the detected movement of the detected input.

2. The method of claim 1 wherein the step of moving at least one displayed pixel of the selected displayed object comprises moving the at least one displayed pixel from an initial display pixel position to an adjacent display pixel position in responsive to movement of the detected input from an initial detection position to an adjacent detection position.

3. The method of claim 1 wherein the at least one displayed pixel of the selected displayed object is moved from an initial display pixel position to a further display pixel position which is most closely located to a reduced scale distance of a distance of the detected input from its initial detected position to its further detected position.

4. The method of claim 1 further comprising:
   in a further object transformation mode, moving at least one displayed pixel of the selected displayed object by a distance corresponding to a distance of the detected movement of the detected input; and
   selecting between the object transformation mode and the further object transformation mode.

5. The method of claim 4 wherein the step of moving at least one displayed pixel of the selected displayed object comprises moving the at least one displayed pixel from an initial display pixel position to a further display pixel position in response to movement of the detected input from an initial detection position to a further detection position, the further display pixel position being the display pixel position which is most closely located to the position of the further detection position.

6. The method of claim 4 wherein in the further object transformation mode each input movement detected between detection positions causes at least one pixel of the displayed object to move by a plurality of pixel positions, and wherein in the object transformation mode each input movement detected between detection positions causes at least one pixel of the displayed object to move by a single pixel position.

7. The method of claim 4 wherein in the further object transformation mode the at least one displayed pixel is movable by a distance which corresponds to the distance by which the detected input is moved.

8. The method of claim 4 further comprising selecting between the modes in dependence on a characteristic of the detected input.

9. The method of claim 8 wherein the characteristic of the detected input is one or more of: the contact surface area of the detected input; the number of contact points associated with the detected input; the position of a contact point of the detected input relative to the selected object; or the speed of movement of the detected input.

10. The method of claim 1 wherein in the object transformation mode the at least one displayed pixel is movable by a distance which is a reduced scale distance of the distance by which the detected input is moved.

11. A computer program product for storing, on a non-transitory computer-readable medium, computer program code which, when run on a computer, performs the method of claim 1.

12. An interactive display system including:

an interactive display surface, in which interactive display surface a display resolution is greater than a detection resolution, for detecting one or more inputs at said surface, and for controlling the display of an object on the interactive display surface in dependence on detected movement of an input at the surface whilst the input is selecting the object, and a computer system including displayed object transformation controller, for transforming the display of at least one displayed pixel of the selected object, in dependence upon a detected movement of the input at the interactive surface, the displayed object transformation controller being adapted, in a first mode of operation, to move at least one displayed pixel of the displayed object by a distance which is less than the detected distance moved by the input.

13. The system of claim 12 wherein the displayed object transformation controller is for moving the at least one displayed pixel from an initial display pixel position to an adjacent display pixel position responsive to movement of the detected input from an initial detection position to an adjacent detection position.

14. The system of claim 12 wherein the displayed object transformation controller is for moving the at least one displayed pixel from an initial display pixel position to a further display pixel position which most closely matches the position of a reduced scale distance of a distance of the detected input from its initial position, in a direction determined by the input detected direction.

15. The system of claim 12 wherein the displayed object transformation controller is configured, in a further object transformation mode, to move at least one displayed pixel of the selected displayed object by a distance corresponding to a distance of the detected movement of the detected input; and is further configured to select between the object transformation mode and the further object transformation mode.

16. The system of claim 15 wherein the displayed object transformation controller is further configured to move the at least one displayed pixel to a displayed pixel position responsive to movement of the detected input from an initial detection position to a further detection position, the further display pixel position being the display pixel position which most closely matches the position of the further detection position.

17. The system of claim 15 wherein the displayed object transformation controller is further configured, in the further object transformation mode, such that at least one pixel of the selected displayed object is moved from a starting position to a finishing position which most closely matches the detected finishing position of the detected input.

18. The system of claim 15 wherein the displayed object transformation controller is further configured such that in the further object transformation mode each input movement detected between detection positions causes at least one pixel of the displayed object to move by a plurality of pixel positions, and wherein in the object transformation mode each input movement detected between detection positions causes at least one pixel of the displayed object to move by a single pixel position.

* * * * *